United States Patent [19]

Udayasekaran

[11] 4,296,281

[45] Oct. 20, 1981

[54] STATIC, SOLID STATE ORIGINATING REGISTER COMPATIBLE WITH AN ELECTROMECHANICAL TELEPHONE CROSS-BAR SWITCHING SYSTEM

[75] Inventor: Rajasekaran Udayasekaran, Mississauga, Canada

[73] Assignee: Northern Telecom Limited, Montreal, Canada

[21] Appl. No.: 115,906

[22] Filed: Jan. 28, 1980

[51] Int. Cl.³ .............................................. H04Q 3/54
[52] U.S. Cl. .......................... 179/18 EB; 179/18 ES; 179/18 FG
[58] Field of Search ............ 179/18 EB, 18 ES, 18 E, 179/18 FG, 18 FF

[56] References Cited

U.S. PATENT DOCUMENTS

| | | | |
|---|---|---|---|
| 3,458,662 | 7/1969 | Hayes et al. | 179/18 ES |
| 3,590,165 | 6/1971 | Curtis et al. | 179/18 E |
| 4,042,784 | 8/1977 | Lupattelli et al. | 179/18 EB |

FOREIGN PATENT DOCUMENTS

| | | | |
|---|---|---|---|
| 7411108 | 2/1975 | Netherlands | 179/18 ES |
| 2004163 | 3/1979 | United Kingdom | 179/18 ES |

OTHER PUBLICATIONS

"NX-IE, an Electronically Controlled Crossbar Switching System", Aro et al., *IEEE Trans. on Comm. Tech.*, vol. COM-18, No. 6, Dec. 1970, pp. 734-740.
"Stored-Program-Controlled Register System ANA 30 for Crossbar Exchanges", S. Ellstam et al., *Ericsson Review*, No. 4, 1973, pp. 131-145.
"Replacement of Rotary Registers by Processor", Widmar, *Electrical Communication*, vol. 49, No. 2, 1974, pp. 140-143.

*Primary Examiner*—Thomas W. Brown
*Attorney, Agent, or Firm*—Robert C. Hogeboom

[57] ABSTRACT

A static, solid-state originating register for use with an electromechanical telephone cross-bar switching system (e.g. an NE-5* switching system by Northern Telecom) is disclosed. The static, solid-state originating register comprises a plurality of static, solid-state scan networks responsive to an equal plurality of scan points, in a one-to-one relationship, for monitoring the status of the scan points. Also included are a plurality of static, solid-state signal distributor networks for activating associated equipment in the switching system. A microprocessor is employed for controlling the operation of the scan networks and the signal distributor networks. An isolator device is used for interfacing the microprocessor with both the scan networks and the signal distributor networks.

*Trademark

9 Claims, 9 Drawing Figures

STATIC, SOLID STATE ORIGINATING REGISTER COMPATIBLE WITH AN ELECTROMECHANICAL TELEPHONE CROSS-BAR SWITCHING SYSTEM

BACKGROUND OF THE INVENTION

This invention relates generally to originating registers for use in telephone equipment, and more particularly to static, solid-state originating registers that are compatible with electromechanical systems.

Originating registers are well known components in electromechanical cross-bar switching systems. Examples of two such cross-bar switching system are the NE-5* cross-bar system manufactured by Northern Telecom Limited and the number 5 cross-bar system manufactured by Western Electric. The static, solid-state originating registers that are the subject matter of the present invention will be described in the context of the NE-5 cross-bar system; in fact, the static, solid-state originating registers that are the subject matter of the present invention are a direct replacement for the electromechanical originating registers that were originally employed in the NE-5 cross-bar system.

*Trademark

As stated previously, originating registers are well known components in electromechanical cross-bar switching systems. In general terms, the operation of an originating register can be described as follows. When the handset of a telephone set is lifted off-hook, the "dial tone marker" selects an originating register, which then proceeds to receive the serially dialled digits. After pre-screening the dialled digits and deciding that sufficient digits have been dialled for that call, the originating register calls in an idle "completing marker". The originating register then transfers all the data (re the dialled digits), in parallel format, to the "completing marker". The originating register then drops out of the call processing sequence, allowing the completing marker to complete the processing of the telephone call.

The static, solid-state originating register of the present invention provides the same function of the just described originating register of the NE-5 cross-bar system; in fact, one embodiment is a lead for lead replacement for the NE-5 originating register.

SUMMARY OF THE INVENTION

In simplified terms, the static originating register of the present invention employs one microprocessor shared between two originating registers. Scan points (used to observe the status of the input leads) and signal distributor points (used to activate output leads) are under the control of the microprocessor and are buffered from the microprocessor via a bus isolator to be described later in more detail.

Stated in other terms, the present invention is a static, solid-state originating register apparatus for use with an electromechanical telephone cross-bar switching system, the originating register apparatus comprising: a plurality of static, solid-state scan networks responsive to an equal plurality of scan points, in a one-to-one relationship, for monitoring the status of the scan points; a plurality of static, solid-state signal distributor networks for activating associated equipment in the switching system; a microprocessor for controlling the operation of both the scan networks and the signal distributor networks; and an isolator circuit for interfacing the microprocessor with both the scan networks and the signal distributor networks wherein said isolator circuit comprises: circuitry for changing the voltage levels of at least some address signals, originating from the microprocessor, to voltage levels suitable for use with both the signal distributor networks and the scan networks; logic circuitry, for providing command signals to read and to write, based both upon the logic states of a predetermined portion of the address signal, and upon the read and write signals generated by the microprocessor; delay means, responsive to output signals of the logic circuitry, for selectively delaying the occurrence of a read signal, a write signal and a signal distributor clock signal so as to provide a proper timing sequence for appropriate operations; circuitry, for changing the voltage levels of signals eminated from the delay means, to voltage levels suitable for use with both the scan networks and the signal distributor networks; and a data link interface circuit for interfacing bi-directional data transmitted by the microprocessor, on a bi-directional data link, both with the data received from the scan networks, on a uni-directional data link, and with the data transmitted to the signal distributor networks, on a uni-directional data link.

Stated in yet other terms, the present invention is a static, solid-state originating register apparatus for use with an electromechanical telephone cross-bar switching system, the originating register apparatus comprising: a plurality of static, solid-state scan networks responsive to an equal plurality of scan points, in a one-to-one relationship, for monitoring the status of the scan points; a plurality of static, solid-state signal distributor networks for activating associated equipment in the switching system; a microprocessor for controlling the operation of the scan networks and the signal distributor networks; and an isolator circuit for interfacing the microprocessor with both the scan networks and the signal distributor networks; the isolator circuit comprising (a) circuitry for changing the voltage levels of a predetermined portion of address signals, originating from the microprocessor, to voltage levels compatible with the signal distributor networks and the scan networks; (b) logic circuitry for producing command signals to read and to write, in response to signals generated by the microprocessor; (c) delay circuitry for selectively delaying the read and write commands from the logic circuitry, prior to applying them to the scan networks and the signal distributor networks, and for producing a signal distributor clock pulse so as to provide a proper timing sequence for appropriate operations; and (d) circuitry for interfacing bi-directional data of the microprocessor with uni-directional data of both the scan networks and the signal distributor networks.

BRIEF DESCRIPTION OF THE DRAWINGS

The invention will now be described in more detail with reference to the accompanying drawings, wherein like parts in each of the several figures are identified by the same reference character, and wherein.

DETAILED DESCRIPTION

Figure 1:
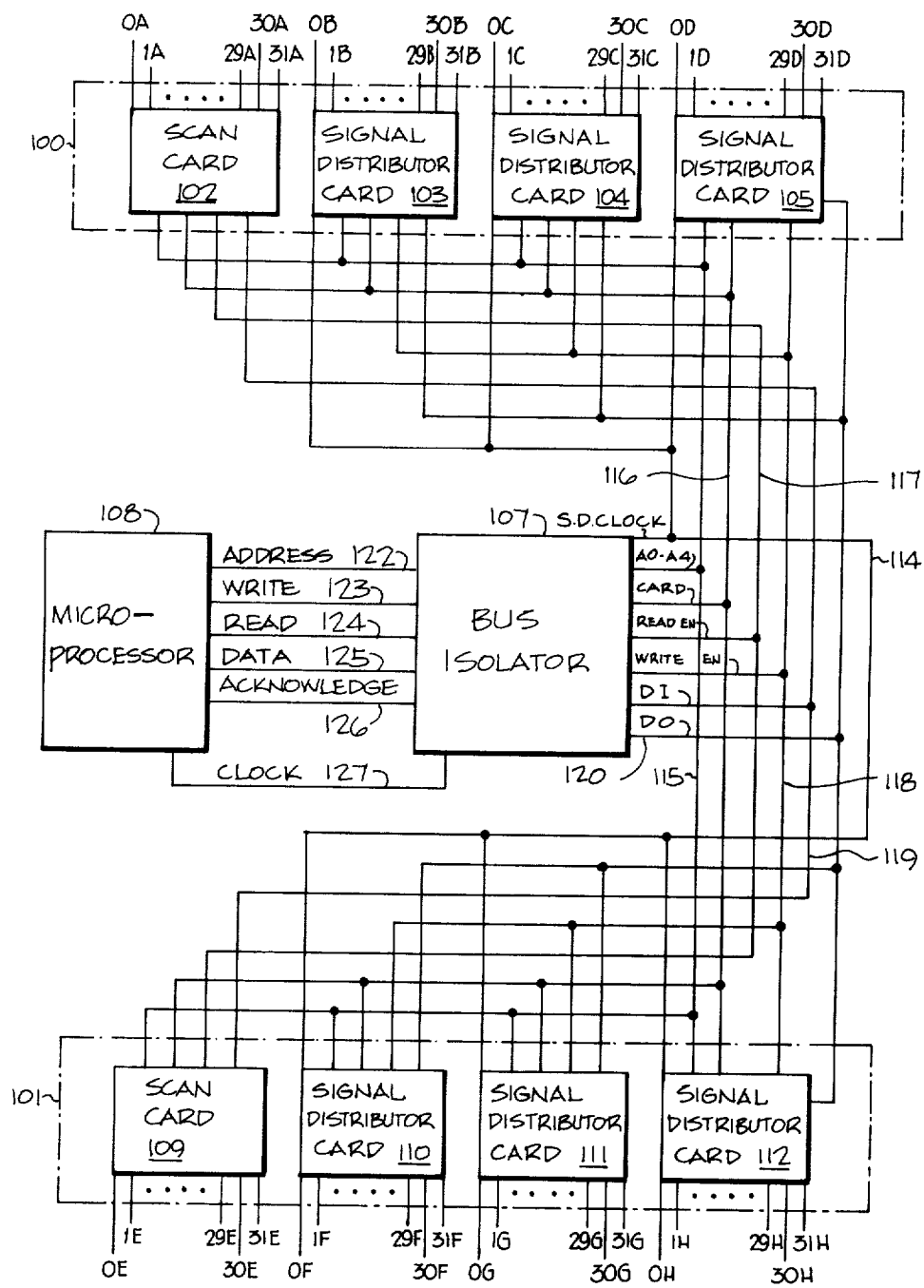
FIG. 1 is a simplified block diagram of two originating registers according to the preferred embodiment of the present invention.

FIG. 1 depicts the simplified block diagram for two originating registers (OR's) 100 and 101. As is readily apparent from FIG. 1, OR 100 comprises four "cards" or printed circuit boards (PCB) 102, 103, 104 and 105 which are interconnected to bus isolator 107 as shown in FIG. 1. Bus isolator 107 is in turn connected to microprocessor 108 as is shown in the Figure.

Card 102 contains thirty-two scan points indicated by the reference characters 0A to 31A inclusive. The scan points contained on card 102 are used to observe the status of input leads (not shown), some of which connect through appropriate equipment (not shown) to subscriber equipment (e.g. telephone sets, not shown) and some of which connect to ancillary equipment in the NE-5 cross-bar switch (e.g. a completing marker, not shown). The exact allocation of the scan points varies from application to application, but is approximately 80% connected to operate in response to subscriber equipment and 20% connected to operate in response to the completing marker. The scan points are used to observe the status of input leads (e.g. to detect dial pulses) and expect to receive either ground (or zero) potential, representative of a logic 1, or a potential of −48 volts (or open circuit) which represents a logic 0.

Cards 103, 104, and 105 each contain thirty-two signal distribution points indicated by the reference characters 0B to 31B, 0C to 31C, and 0D to 31D, for a total of ninety-six signal distributor points. The signal distributor points contained on cards 103, 104 and 105 are used to activate output leads (not shown), some of which connect through appropriate equipment (not shown) to subscriber equipment (e.g. telephone sets, not shown) and some of which connect to ancillary equipment in the NE-5 cross-bar switch (e.g. a completing marker, not shown). The exact allocation of the signal distributor points varies from application to application, but is approximately 20% connected to operate in conjunction with subscriber equipment and 80% connected to operate in conjunction with the completing marker. The signal distributor points are used to activate or deactivate output leads (not shown) with an excess of 150 milliamperes of current per output lead. A logic 1 results in a ground (or zero) potential being applied by a signal distributor point, and a logic 0 results in an open circuit being applied by a signal distributor point.

Originating register 101 has analogous components, namely scan card 109, and signal distributor cards 110, 111 and 112, connected as shown in FIG. 1 and operating in the same fashion as do the components 102, 103, 104 and 105 respectively of originating register 100.

The bus isolator 107 and the originating registers 100 and 101 are interconnected by a clock lead 114, an address bus 115, a card bus 116, a read enable lead 117, a write enable lead 118, a data input lead 119, and a data output lead 120, all as shown and interconnected in FIG. 1.

The bus isolator is connected to microprocessor 108 via address bus 122, memory write lead 123, memory read lead 124, bi-directional data bus 125, acknowledge lead 126, and clock lead 127.

Microprocessor 108 is an SBC 80/05 from Intel. The interaction of the various blocks in FIG. 1 will become apparent as the remaining figures are discussed.

Figure 2:
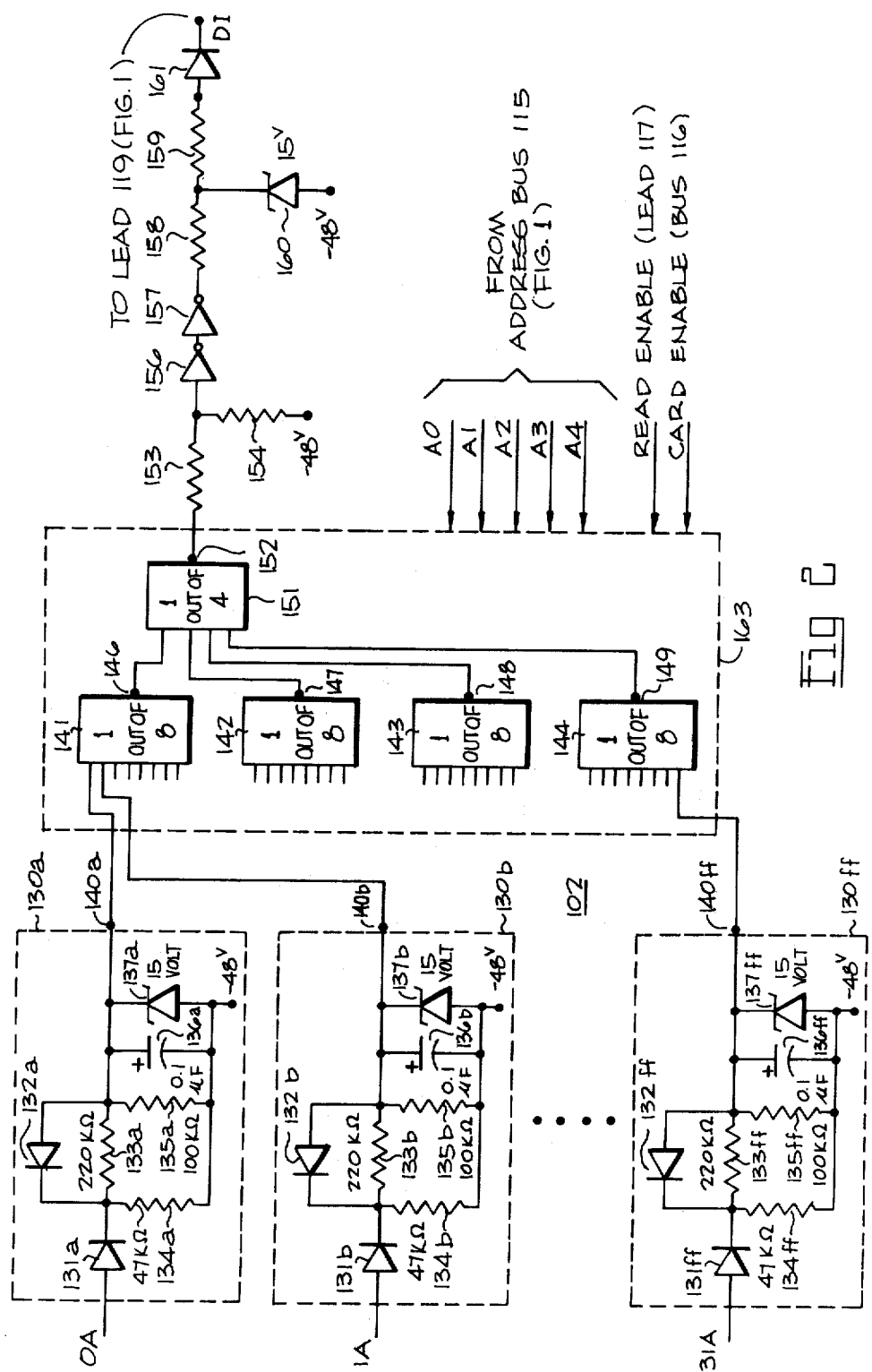
FIG. 2 is a simplified schematic of scan points as employed in FIG. 1.

FIG. 2 is a simplified schematic of the scan points 0A to 31A inclusive of scan card 102. Scan card 102 comprises thirty-two scan networks 130a, 130b . . . 130z, 130aa, 130bb . . . 130ff, inclusive. Scan point 0A is the input for network 130a, scan point 1A is the input for network 130b, and similarly for the remainder, with scan point 31A being the input for scan network 130ff. Scan network 130a comprises diodes 131a, and 132a, resistors 133a, 134a, and 135a, capacitor 136a and zener diode 137a, all interconnected as shown in FIG. 2. Analogous components, as indicated in FIG. 2, comprise scan networks 130b to 130ff, inclusive.

The scan points 0A to 31A and the scan networks 130a to 130ff are used to observe the status of input leads (not shown). In this application, the scan networks 130a to 130ff act as buffers between the stimulus (typically in the range of −48 volts) applied to their inputs (i.e. 0A to 31A, respectively) and the voltage levels that appear at their output terminals 140a to 140ff respectively. The scan networks 130a to 130ff can withstand high transient voltages and can ignore contact bounce (i.e. from relays in associated equipment, not shown) of a few milliseconds. The voltage levels on output terminals 140a to 140ff are directly useable by CMOS (complementary metal-oxide semiconductor) components.

In scan network 130a, diode 131a provides protection from negative going transients. Resistor 134a provides "wetting current" for relay contacts (not shown) which are connected to scan point 0A. Resistors 133a and 135a, along with capacitor 136a, provide the timing delay to account for contact bounce of the relay contacts. Diode 132a is employed to equalize the rise and fall times of the "debounce" network formed by resistors 133a and 135a, and capacitor 136a. Zener diode 137a prevents the voltage at terminal 140a from going more positive than −33 volts.

Output terminals 140a to 140ff are connected to the input terminals 1 out of 8 selectors 141, 142, 143 and 144 such that selector 141 (e.g. Motorola MC14051) selects on its output terminal 146, one of the outputs from scan networks 130a to 130h, inclusive; selector 142 selects on its output terminal 147, one of the outputs from scan networks 130i to 130p, inclusive; selector 143 selects on its output terminal 48, one of the outputs from scan networks 130q to 130x, inclusive; and selector 144 selects on its output terminal 149, one of the outputs from scan networks 130y to 130ff.

The outputs from 1 out of 8 selectors 141, 142, 143 and 144 are then applied to the inputs of 1 out of 4 selector 151 (e.g. Motorola MC14052), which selects only one input to appear on its output terminal 152. The selection of the scan network being accessed is done by the five address bits A0 to A4 inclusive (from address bus 115) and by the card enable bus (bus 116). The read enable (lead 117) acts as a control signal. The output terminal 152 of 1 out of 4 selector 151 is applied to the data input lead 119 via the network shown in FIG. 2.

The combination of selectors 141, 142, 143, 144 and 151 form a 1 out of 32 selector 163. The binary address bits A0, A1, A2, A3, and A4 define which one of the thirty-two inputs is connected to output terminal 152; This technique is well known in the art and will not be discussed in greater detail. The card enable binary bit (on bus 116) is employed to turn 1 out of 32 selector 163 on and off. When 1 out of 32 selector 163 is turned off, the voltage at terminal 152 is floating and resistor 154 maintains the magnitude of the voltage applied to the input of inverter 156 at −48 volts; resistor 153 is a current limiting resistance. Inverters 156 and 157 are Schmitt trigger devices which provide hysteresis which is necessary for detecting the voltage output from terminals 140a to 140ff. Resistors 158 and 159 function to limit the current. Zener diode 160 is a voltage limiting diode that clamps the voltage between −33 volts and −48 volts. Diode 161 provides isolation from external ground faults.

Figure 3:
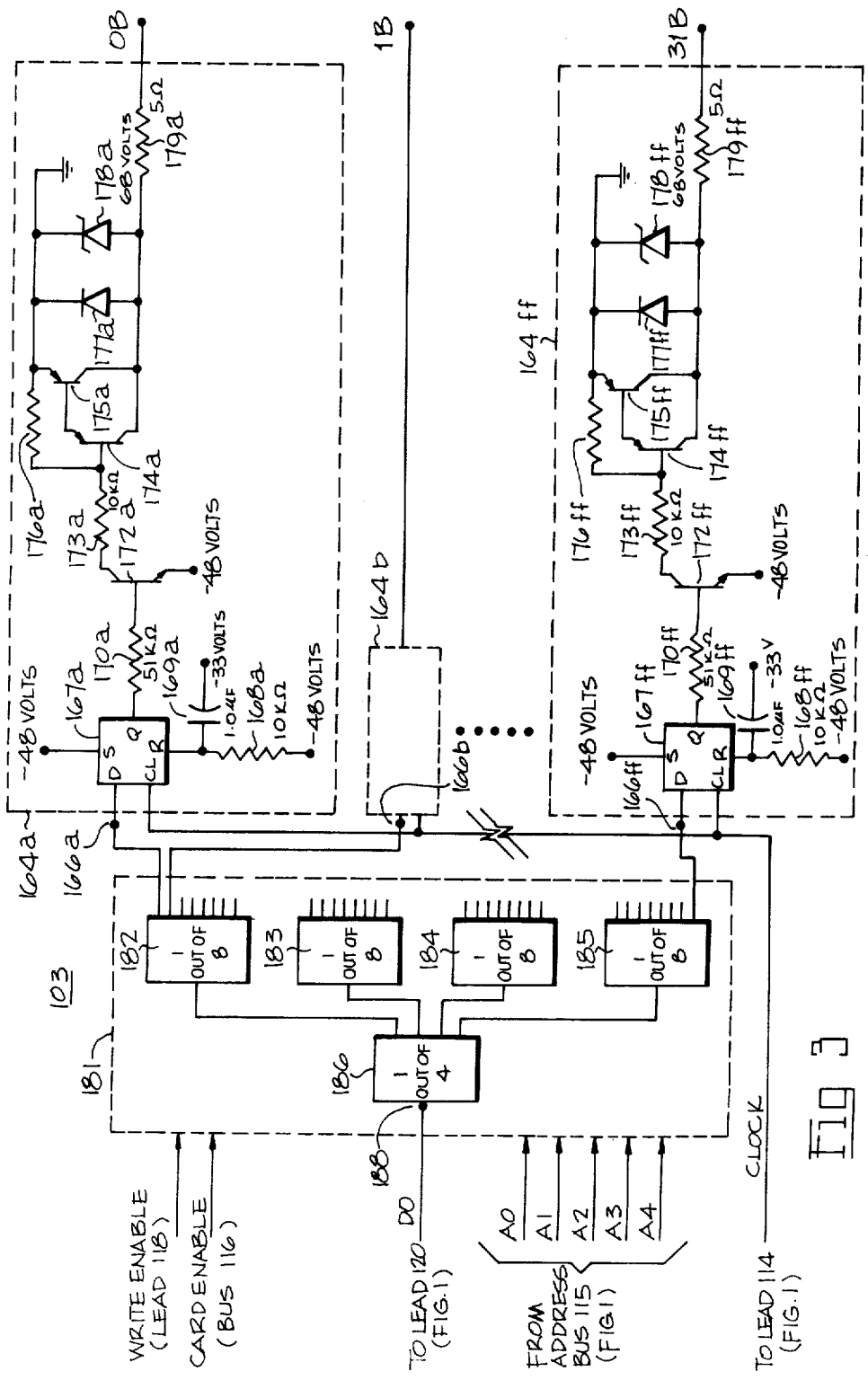
FIG. 3 is a simplified schematic of signal distributor points as employed in FIG. 1.

FIG. 3 depicts a simplified schematic of the signal distributor points 0B to 31B inclusive of signal distributor card 103. Signal distributor card 103 comprises thirty-two signal distributor networks 164a, 164b, ... 164z, 164aa, 164bb, ... 164ff, inclusive. Signal distributor point 0B is the output for network 164a, signal distributor point 1B is the output for network 164b, and similarly for the remainder, with signal distributor point 31b being the output for signal distributor network 164ff.

Signal distributor network 164a comprises an input terminal 166a which is connected to the D-input of D-type flip-flop 167a. Network 164a also comprises resistor 168a, capacitor 169a, resistor 170a, transistor 172a, resistor 173a, transistors 174a and 175a (connected in a Darlington configuration), resistor 176a, diode 177a, zener diode 178a, and resistor 179a, all interconnected as shown in FIG. 3. Analagous components, as indicated in FIG. 3, comprise signal distributor networks 164b to 164ff, inclusive.

Flip-flop 167a, of signal distributor network 164a, latches in the state of terminal 166a when a clock pulse on lead 114 occurs. Resistor 168a and capacitor 169a function to initialize the state of flip-flop 167a when power is first applied to the circuit. When the Q output of flip-flop 167a is −33 volts (logic 1 state), transistor 172a is biased on and current flows through resistors 176a and 173a; this in turn biases on the Darlington connections of transistors 174a and 175a providing a ground (or zero) voltage to signal distributor point 0B. Resistor 179a functions to limit the current. Diode 177a provides protection when the back EMF (electromotive force) voltage at point 0B goes more positive the zero volts. Zener diode 178a functions to clamp the back EMF voltage from going more negative than −68 volts, which serves to protect the Darlington connection of transistors 174a and 175a. It should be noted that transistors 174a and 175a, along with resistor 176a and diode 177a, are part of a single device known as a 2N6036.

The signal distributor points 0B to 31B and the signal distributor networks 164a to 164ff are used to activate output leads (not shown) by providing a direct current of at least 150 milliamps (m.a.) in order to energize relays (not shown). The networks 164a to 164ff also have to withstand the back EMF (electromotive force) generated by the relays (not shown) when they are de-energized. It should be noted that the networks 164a to 164ff are fed serially and the signal distributor points 0B to 31B are later read in a parallel fashion.

Input terminals 166a to 166ff are responsive to the signals from 1 out of 32 selector 181 as shown in FIG. 3. 1 out of 32 selector 181 comprises 1 out of 8 selectors 182, 183, 184 and 185 and 1 out of 4 selector 186, connected as shown in FIG. 3. Selector 181 operates to connect the input terminal 188 of selector 186 to one of the output terminals of one of selectors 182, 183, 184 and 185. The input terminals 166a to 166ff are connected to selector 181 such that terminals 166a to 166h, inclusive, are connected to selector 182; inputs 166i to 166p, inclusive, are connected to selector 183; inputs 166q to 166x, inclusive, are connected to selector 184; and, inputs 166y to 166ff, inclusive, are connected to selector 185.

Address bits A0 to A4 inclusive (from address bus 115) select which one of the thirty-two outputs of selector 181 will be connected to input terminal 188 (i.e. to lead 120). Card enable (bus 116) selects which card (i.e. 102 to 105 or 109 to 112) is being selected. The write enable (lead 118) controls the "turning on" of selector 181 (i.e. the completing of one path from terminal 188 to one of its thirty-two outputs). The clock pulses on bus 114 control the timing of the operation of flip-flops 167a to 167ff, inclusive. As the addressing of selector 181 (via bus 115 and 116) and the control of selector 181 (via lead 118) are well known techniques, they will not be discussed in greater detail.

Figure 4:
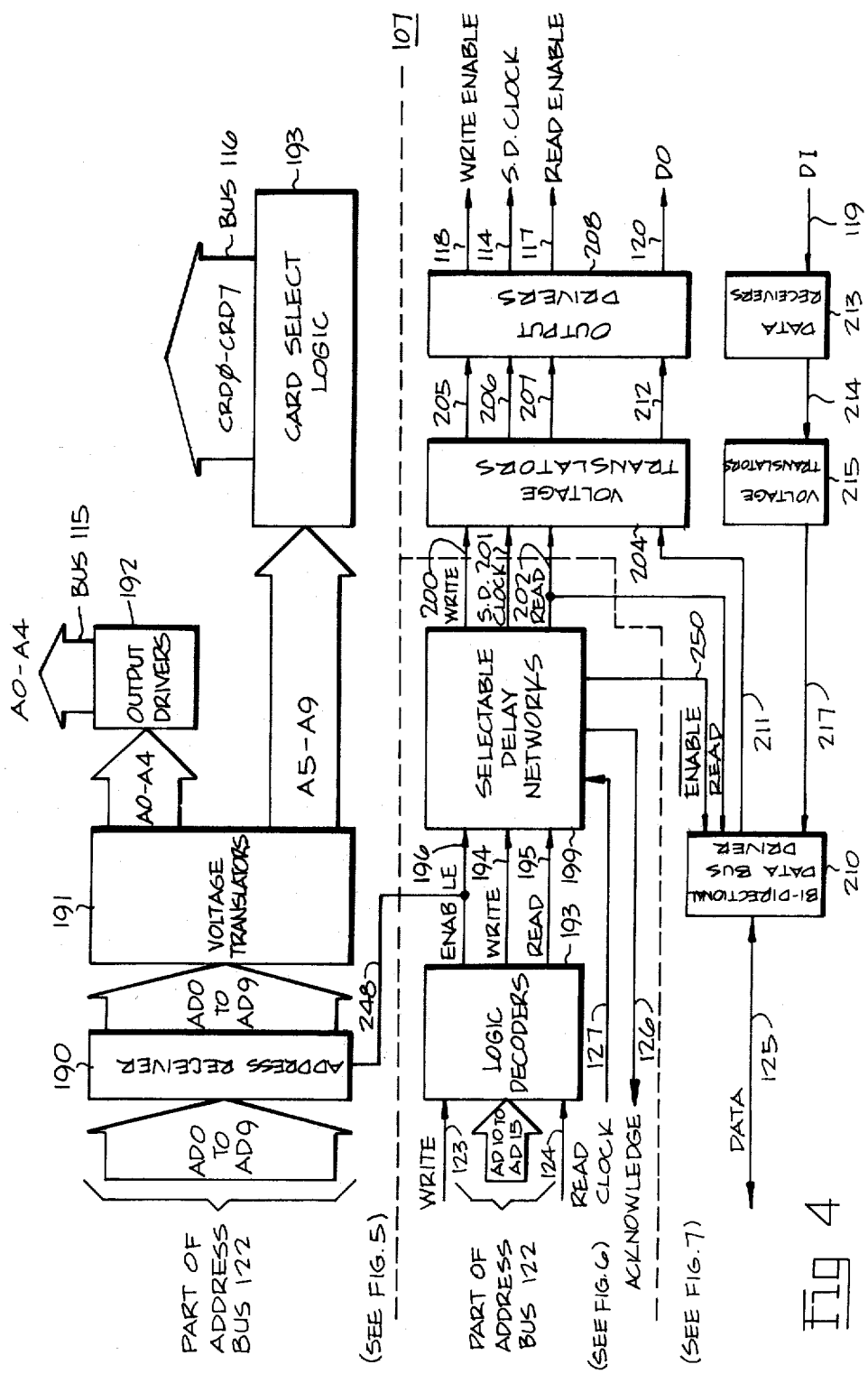
FIG. 4 is a simplified block diagram of the bus isolator of FIG. 1.

FIG. 4 is a block diagram of bus isolator 107 (FIG. 1). Address bits AD0 to AD9 are received by address receiver 190 (from microprocessor 108, FIG. 1). Address receiver 190 sends the address bits AD0 to AD9 to voltage translators 191 which "translate" the +5 volt based signals used by the microprocessor 108 to the −48 volt based signals employed by the electromechanical telephone switching system, thereby producing address bits A0 to A9, respectively. Address bits A0 to A4 inclusive are applied to output drivers 192 for transmission to cards 102 to 105 and 109 to 112 (see FIG. 1). Address bits A5 to A9, inclusive, are applied to card select logic 193 for selecting one of cards 102 to 105 or 109 to 112, FIG. 1 (i.e. CRD$\phi$ to CRD7).

Address bits AD10 to AD15 (from microprocessor 108, FIG. 1) are applied to logic decoders 193, the outputs of which are a write signal on line 194, a read signal on line 195 and an enable signal on line 196; note that a read signal and a write signal (from microprocessor 108, FIG. 1) are also applied to the inputs of logic decoders 193. The enable, write, and read signals output from logic decoders 193, along with a clock signal on line 198, are applied to the inputs of selectable delay networks 199. The function of delay network 199 is to produce on its output lines 200, 201 and 202 a write signal, a clock signal, and a read signal, respectively, delayed in time with respect to the corresponding input signal; this will be described more fully in conjunction with FIG. 6.

The write signal, the clock signal, and the read signal, on lines 200, 201, and 202 respectively are applied to voltage translators 204 which transform the voltages of the signals from the +5 volt based levels of the microprocessor 108 (FIG. 1) to the −48 volt based levels of the electromechanical crossbar switch. The outputs of voltage translators 204 on lines 205, 206 and 207 are applied to output drivers 208 and are output on write enable lead 118, signal distributor (SD) clock lead 114, and read enable lead 117, respectively. Output data, from bi-directional data bus driver 210, on lead 211 is also applied to the input of voltage translator 204, and from there to output drivers 208 on lead 212 and is finally output on data output lead 120. Data received from data input lead 119 is applied to data receiver 213 and thence by lead 214 to voltage translator 215 which translates the −48 volt based levels of the electromechanical crossbar switching systems to the +5 volt based levels of microprocessor 108 (FIG. 1). The data signal output from volage translator 215 is applied to bi-directional data bus driver 210 via lead 217. Data bus driver 210 functions to interface uni-directional data lines 211 and 217 with bi-directional data line 125 which connects to microprocessor 108 (FIG. 1).

Figure 5:
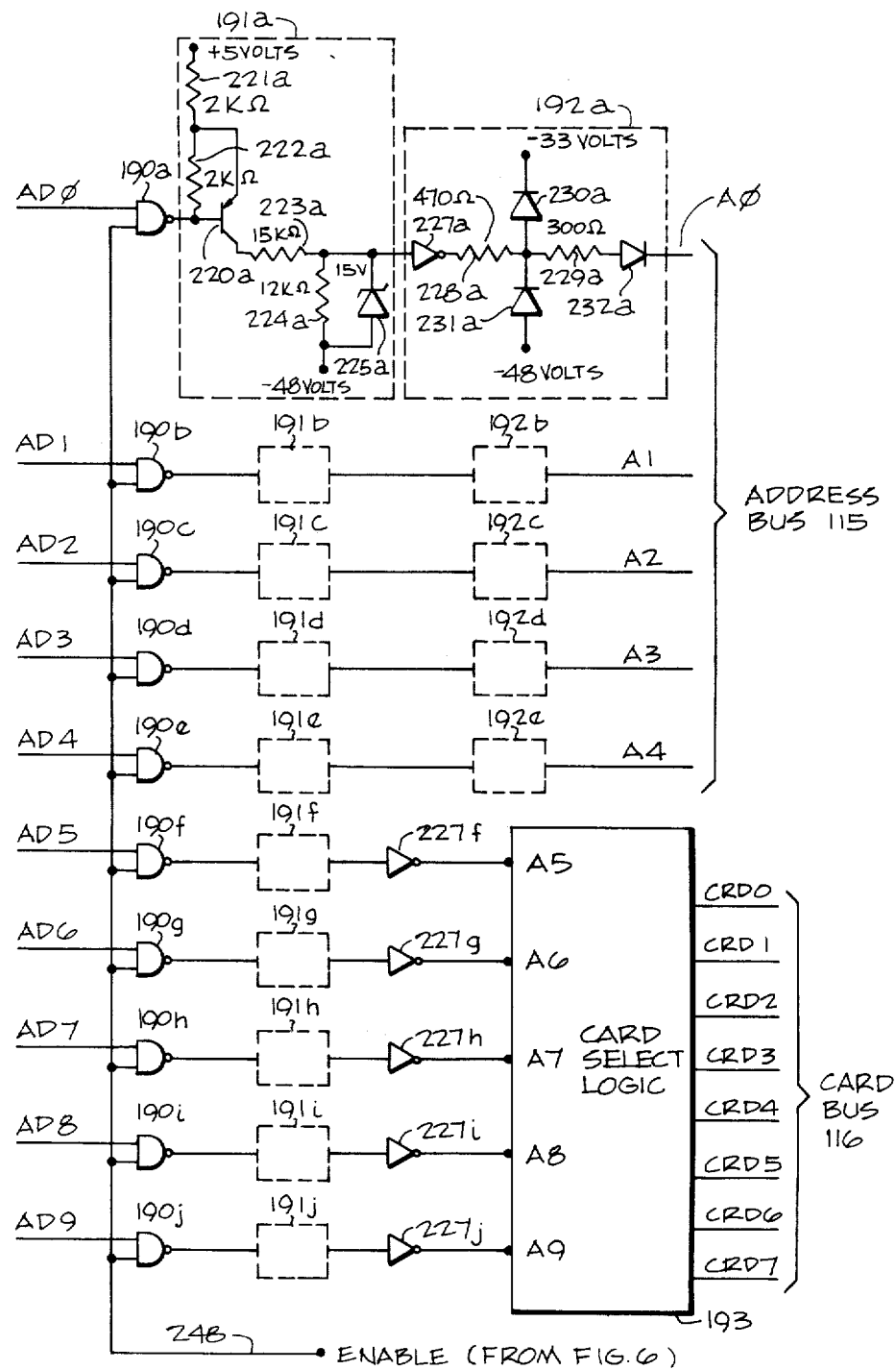
FIGS. 5 to 7 inclusive are simplified schematics depicting the circuitry of FIG. 4.

FIG. 5 is a simplified schematic of address receivers 190, voltage translators 191, output drivers 192, and card select logic 193 of FIG. 4. It may prove helpful, when referencing FIGS. 5, 6 and 7, to refer to the waveforms of FIGS. 8 and 9. Address receivers 190 are comprised of individual address receivers 190a to 190j, referred to collectively as address receivers 190. As depicted in FIG. 5, each address receiver 190a to 190j is a logic NAND gate.

Figure 6:
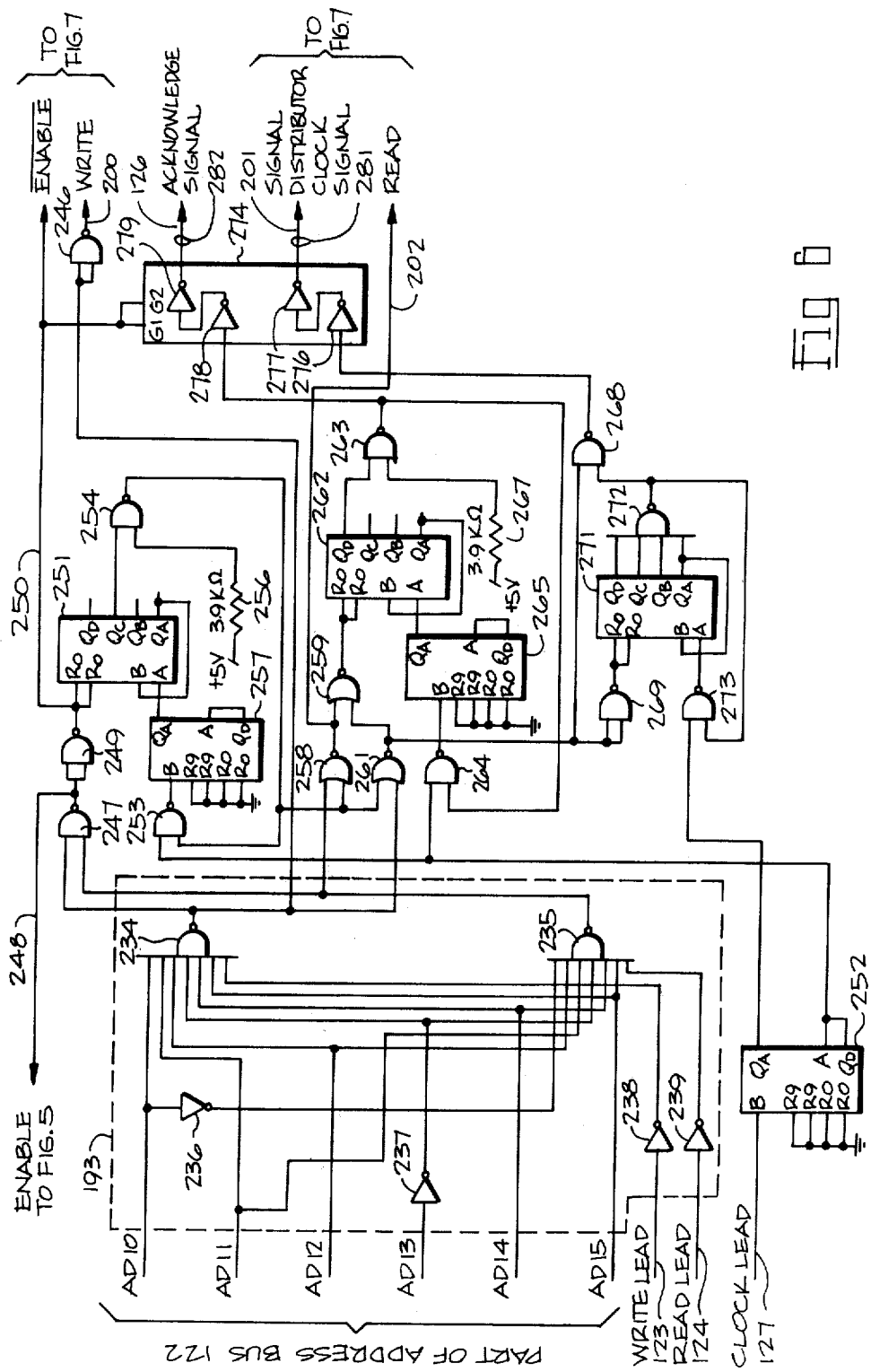

One input of address receiver 190a is address bit AD0 and the other input is the enable signal from logic decoders 193 of FIG. 6. The enable signal is common to one input of each of the address receivers 190a to 190j, inclusive. The other input in each case is one of the address bits AD0 to AD9 as shown in the Figure. The output of address receiver 190a is applied to the input of voltage translator 191a and the output of translator 191a is in turn applied to the input of output driver 192a, the output of which is address bit A0. Address bits AD1 to AD4 are treated in the same fashion as address bit AD0, as is depicted in FIG. 5, with address bits A1 to A4 appearing on the outputs of output drivers 192b to 192e, respectively.

Voltage translator 191a comprises a bipolar transistor 220a, biasing resistors 221a and 222a, resistors 223a and 224a, and zener diode 225a, all interconnected as shown in FIG. 5. The operation of voltage translator 191a is as follows. When the output of receiver 190a goes to a logic 0 level (zero volts), transistor 220a turns on and drives current through resistors 223a and 224a. Zener diode 225a prevents the voltage at the input of inverter 227a from going more positive than $-33$ volts. Thus zero volts from the output of address receiver 190a is converted to $-33$ volts. When $+5$ volts (logic 1) appears at the output of receiver 190a, transistor 220a is turned off and $-48$ volts is obtained at the input to inverter 227a. The construction and operation of voltage translators 191b to 191j, inclusive are identical to those of voltage translator 191a.

Output driver 192a comprises inverter 227a, resistors 228a and 229a, and diodes 230a, 231a, and 232a. The operation of output driver 192a is as follows. Resistors 228a and 229a perform a current limiting function. Diodes 230a and 231a function to limit the voltage, appearing at their common junction, to the approximate range of $-33$ volts to $-48$ volts. Diodes 232a provides isolation against externally applied faulty grounds on lead A$\phi$. The construction and operation of output drivers 192b to 192e, inclusive, are identical to those of output driver 192a.

The outputs of voltage translators 191f to 191j, inclusive, are applied to inverters 227f to 227j, inclusive, as depicted in FIG. 5. Inverters 227f to 227j are the same as inverter 227a found in output driver 192a. The output signals of inverters 227f to 227j are address bits A5 to A9 respectively, which are applied to the five inputs of card select logic 193 as shown. The function of card select logic 193 is to select one of its output lines (indicated by CRD0 to CRD7, inclusive) depending upon the state of its inputs. Logic 193, since it has five logic inputs (each being a logic 0 or logic 1), can have a maximum of 32 outputs ($2^5$) only eight of which are depicted, since only eight are needed to select one of the eight cards 102, 103, 104, 105, 109, 110, 111, or 112 (see FIG. 1). As devices suitable for use as card select logic 193 are well known in the art, logic 193 will not be discussed in greater detail.

Turning now to FIG. 6, depicted therein are logic decoders 193 and delay networks 199. Logic decoder 193 comprises NAND gates 234 and 235 and inverters 236, 237, 238 and 239 interconnected as shown in FIG. 6. Address bits AD10 to AD15 (part of address bus 122) are applied to NAND gates 234 and 235 as depicted. The write command from microprocessor 108 (appearing on lead 123) is applied to NAND gate 234 via inverter 238; and the read command from microprocessor 108 (appearing on lead 124) is applied to NAND gate 235. Lead 127 carries the clock signals (of approximately 10 MHz) from microprocessor 108.

For the particular embodiment being described, address bits AD11 to AD15 are logic bits with the states 1, 1, 0, 1, and 1, respectively (i.e. they remain constant and do not change). Address bit AD10 is a logic 1 for a write command, and is a logic 0 for a read command. Note that this results in a difference of 1024 ($2^{10}$) between the write and read addresses. This is accounted for by the microprocessor 108 as is well known.

Additionally, write lead 123 carries a logic 0 for a write command and read lead 124 carries a logic 0 for a read command. Accordingly, a write command results in all the inputs to NAND gate 234 being logic 1's with the result that the output of NAND gate 234 is a logic 0. This logic 0 output signal is applied to the two inputs of NAND gate 246 with the result that its output is a logic 1 signal on write lead 200.

The logic 0 from NAND gate 234 (during a write command) is also applied to one input of NAND gate 247. The other input of NAND gate 247 receives the logic signal output from NAND gate 235, which is a logic 1 during a write command. This occurs since the logic signal on read lead 124 is a logic 1 during a write command, it is inverted to a logic 0 by inverter 239, and since all the inputs to NAND gate 235 are not logic 1's, the output of NAND gate 235 during a write command is a logic 1. Thus NAND gate 247 has one input as a logic 1 and the other input as a logic 0 with the result that the output of NAND gate 247 is a logic 1. This logic signal is the enable signal on lead 248 which goes to FIG. 5; this logic signal is also applied to both inputs of NAND gate 249 which produces a enable signal on lead 250.

For a logic 1 input to NAND gate 249 (which occurs for both a write command and a read command) the output of NAND gate 249 is a logic 0 which is applied to the RO1 and RO2 inputs of four bit binary counter 251 (e.g. Texas Instruments SN7493A) which serves to commence the counting sequence. Counter 251 counts the clock pulses applied to its A input. To explain this, it may be best to turn now to four bit binary counter 252 (e.g. Texas Instruments SN7490A) which is connected to function as a bi-quinary counter.

The counter 252 counts the clock pulses appearing on clock lead 127 (a 10 MHz clock signal). Counter 252 counts the input pulses and the QD output performs a divide by 5 function producing a binary waveform with a 0.5 microsecond period. This is applied to one input of NAND gate 253; the other input of NAND gate 253 is the output of NAND gate 254 which is initially a logic 1, (since output QC is a logic 0 until counter 251 counts four clock pulses and it then becomes a logic 1) and then changes to a logic 1 after a delay of 20 microseconds.

The other input of NAND gate 254 is always a logic 1, provided by resistor 256 and the +5 volt source connected thereto. While the output of NAND gate 254 is a logic 1, the output of NAND gate 253, applied to the B input of four-bit binary counter 257 (a Texas Instruments SN7490A, connected as a bi-quinary counter) alternates between a logic 1 and a logic 0 in response to the varying logic states from counter 252 (i.e. a train of binary pulses with a 0.5 microsecond period). Counter 257 performs a divide-by 10 function to the waveform appearing on its B input and produces on its QA output a waveform having a period of 5.0 microseconds. This is the waveform which is applied to counter 251 which in turn counts four of these pulses before producing a logic 1 on its QC output; the effect of counting four 5 microsecond duration input signals is to produce a delay of 20 microseconds (4×5) before counter 251 produces a logic 1 on its QC output once the counting has commenced. As soon as the QC output of counter 251 goes to a logic 1, the output of NAND gate 254 goes to a logic 0 with the result that NAND gate 253 produces a logic 1 on its output and this output remains constant and consequently the counting of counters 257 and 251 is stopped.

The output from NAND gate 254 is applied to one input of NOR gate 258; the other input of NOR gate 258 receives a signal from NAND gate 235 (a logic 1 for a non-read operation). The result for a write operation is that the output of NOR gate 258 produces a logic 0 which is applied both to one input of NOR gate 259 and to read lead 202. NOR gate 261 receives one of its inputs from NAND gate 254 and one input from NAND gate 234; for a write operation NOR gate receives a logic 0 from NAND gate 234 and delayed logic 0 from NOR gate 254 with the result that the output of NOR gate 261 is a delayed logic 1 (delayed by the 20 microseconds introduced by counter 251). Thus the inputs to NOR gate 259, for a write operation, are a logic 0 and a delayed logic 1 with the result that the output of NOR gate 259 is a delayed logic 0 (delayed by 20 microseconds). As soon as the two RO inputs of four-bit binary counter 262 (a Texas Instruments SN7493A) go low the counter 262 begins counting. The combination of counter 262, NAND gate 263, NAND gate 264 and four-bit binary counter 265 (a Texas Instruments SN7490A, connected for bi-quinary operation) functions in the same manner as do counters 251 and 257 and NAND gates 254 and 253 described earlier, with the exception that the time delay introduced by counter 262 and its associated equipment is 40 microseconds. Consequently, the output of NAND gate 263 is a logic 0 occurring 40 microseconds after counter 262 has been enabled (by the output of NOR gate 259 going low).

The output of NOR gate 261 is also applied to one input of NAND gate 268 and to both of NAND gate 269. For a write operation the output of NOR gate 261 is a logic 1 (delayed by 20 microseconds). Consequently the output of NAND gate 269 is a logic 0 (delayed by 20 microseconds) which means that four-bit binary counter 271 (e.g. Texas Instruments SN7493A) begins counting 20 microseconds after the write operation is initiated. The four outputs QA, QB, QC, and QD of counter 271 are all applied to the inputs of NAND gate 272 with the result that after counter 271 reaches a count of 15 (i.e. binary 1111) all the outputs of counter 271 are at a logic 1 and NAND gate 272 produces a logic 0 at its output. The pulses that counter 271 counts come from the QA output of counter 252 via NAND gate 273. The QA output of counter 252 produces a division by 10 such that the 10 MHz input on terminal B of counter 252 becomes a 1 MHz output on output QA of counter 252, with a period of 1 microsecond. Before NAND gate 272 produces a logic 0 output its output is a logic 1, which means that NAND gate 273 serves to invert the clock signal it receives from counter 252 (with a period of 1 microsecond). As a result, the effect of counter 271 counting to 15 is to introduce a delay of 15 microseconds; the output of NAND gate 272 then becomes a logic 0 (delayed by 20+15 microseconds since the write operation commenced). This logic 0 is applied to one input of NAND gate 273 with the result that the output of NAND gate 273 becomes a constant logic 1 and counter 271 no longer counts.

NAND gate 268 originally had a logic 0 on its upper input (from NOR gate 261) and a logic 1 on its lower input (from NAND gate 272) with the result that it has a logic 1 on its output. After a delay of 20 microseconds, the upper input of NAND gate 268 receives a logic 1, and the lower input remains constant with a logic 1 with the result that the output of NAND gate 268 is a logic 0. After a further 15 microseconds, the lower input of NAND gate 268 becomes a logic 0 (from NAND gate 272) and the upper input of NAND gate 268 remains a logic 1 with the result that the output of NAND gate 268 becomes a logic 1.

The operation for a read operation is similar except that now the output of NAND gate 234 is a logic 1 and the output of NAND gate 235 is a logic 0. This results in a logic 0 appearing on the output of NAND gate 246. The inputs to NAND gate 247 are still a logic 1 and a logic 0 so its output is still a logic 1 (regardless of whether its a read or a write operation). Also, NAND gate 249, counter 251, NAND gate 254, NAND gate 253 and counter 257 function the same for both a read and a write operation, with the same logic states.

NOR gate 258 receives on one of its inputs (from NAND gate 235) a logic 0 signal, and its other input receives a logic 0 (delayed by 20 microseconds), with the result that NOR gate 258 produces a logic 1 signal (delayed by 20 microseconds). NOR gate 261 receives on one of its inputs (from NAND gate 234) a logic 1 signal, and its other input receives a logic 0 (delayed by 20 microseconds), with the result that NOR gate 261 produces a logic 0 signal (with no delay, since both a 1 and a 1 input and a 1 and a 0 input produce 0 output). The output of NOR gate 259 is then a logic 0 delayed by 20 microseconds since the commencement of the read operation. Counter 262, NAND gates 263 and 264, and counter 265 function identically for both the read and write operations.

The output of NOR gate 261, now a logic 0 for the read operation, with no delay occurring, is applied to one input of NAND gate 268 and to both inputs of NAND gate 269. The output of NAND gate 269 is a logic 1 with the result that counter 271 does not count since its two RO inputs are at a logic 1 state. Counter 271 has logic 0s at each of its outputs QA, QB, QC, and QD and NAND gate 272 has a constant logic 1 on its output. NAND gate 268 has a logic 0 on one input and a logic 1 on the other input with the result that it outputs a constant logic 1, for a read operation.

If neither a write nor a read operation is taking place, NAND gate 234 has a logic 1 on its output and NAND gate 235 also has a logic 1 on its output. Consequently NAND gate 247 has logic 1s on both of its inputs and produces a logic 0 on its output (i.e. the enable signal is a logic 0 and the equipment is not enabled). Additionally, counters 251, 262, and 271 do not count since their R0 inputs are at a logic 1 level (with the result that their outputs QA, QB, QC and QD are all at logic 0s).

Bus driver 274 (e.g. Texas Instruments 74LS366) contains a number of inverters of which only four (referred to as 276, 277, 278, and 279) are shown. The inverters 276, 277, 278 and 279 are enabled by the signal applied to the G1 and G2 inputs of driver 274; when the logic signal applied to the G1 and G2 inputs of driver 274 is a logic 0 (i.e. the enable signal from NAND gate 247 is a logic 1) the inverters 276, 277, 278 and 279 are operative and when the logic signal applied to the G1 and G2 inputs of driver 274 is a logic 1 (i.e. when neither a write nor a read operation is being asserted) the inverters 276, 277, 278 and 279 are non-operative.

The output from NAND gate 268 is applied to the input of inverter 276 in driver 274 and then in turn to the input of inverter 277. The output of inverter 277 is the signal distributor clock signal 281 on lead 201. The output of NAND gate 263 is applied to the input of inverter 278, the output of which is applied to the input of inverter 279. The output of inverter 279 is acknowledge signal 282, on lead 283.

Figure 7:
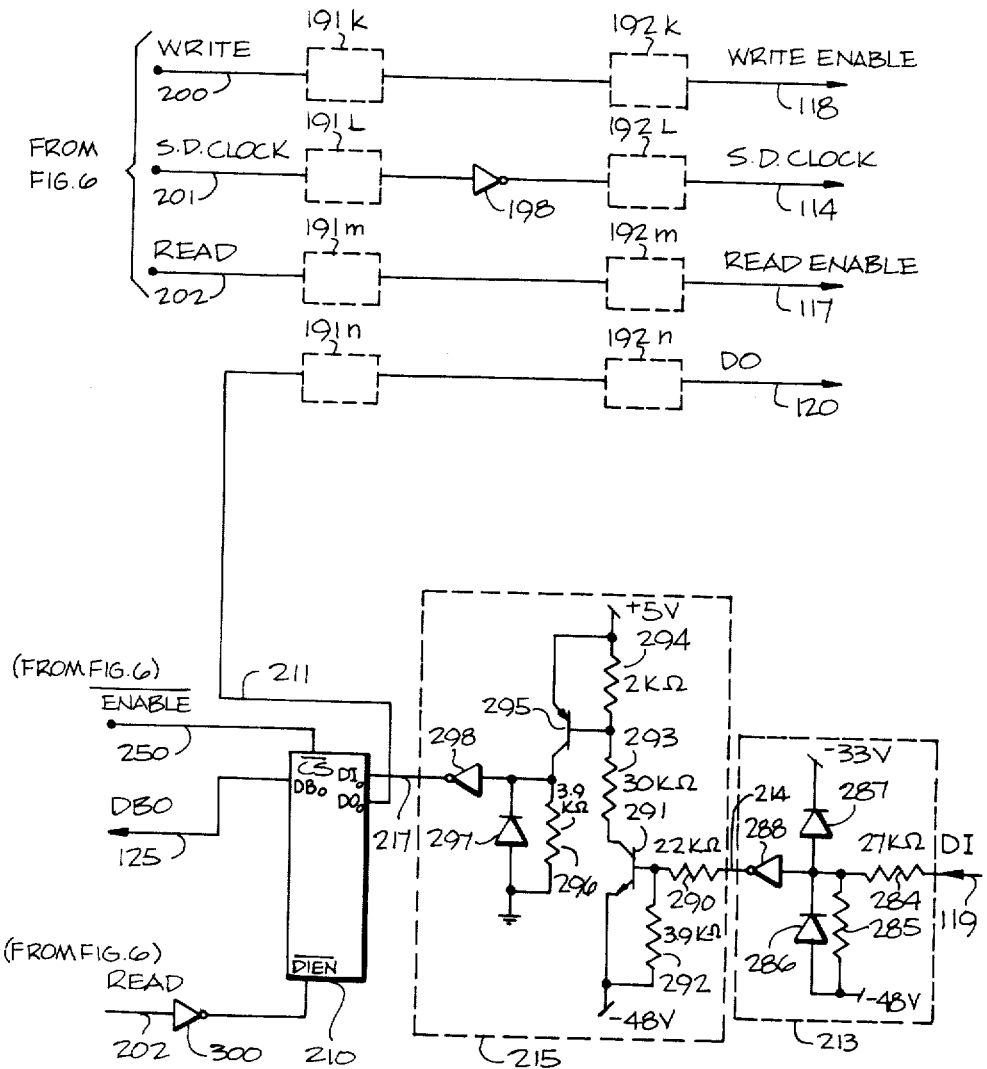

FIG. 7 depicts voltage translator 191K and output driver 192K for the write signal on lead 200 with a write enable signal being produced on lead 118. The series combination of voltage translator 191*l*, inverter 198, and output driver 192*l* function on the signal distributor (SD) clock signal input on lead 201 and output on lead 114. The read signal on lead 202 is applied to voltage translator 191*m*, and then to output driver 192*m*, with the read enable signal being produced on lead 117. As will be explained in more detail shortly, bi-directional data bus driver 210 produces an output data signal on its $DO_o$ terminal which is applied to the series connection of voltage translator 191*n* and output driver 192*n*, as shown, with an output data signal DO being produced on lead 120. As is indicated by the numbering scheme employed, voltage translators 191K to 191*n* inclusive are identical to voltage translator 191*a* (FIG. 5) and output drivers 192*k* to 192*n* inclusive are identical to output driver 192*a* (FIG. 5).

Data receiver 213 receives a data signal DI on lead 119 (from scan card 102 or 109, FIG. 1). Data receiver 213 functions as a protection circuit. The operation of receiver 213 is as follows. With lead 119 at a logic D level (i.e. −48 volts, or open), the input voltage to inverter 288 is held at approximately −48 volts by resistor 285. When lead 119 goes to −33 volts (a logic 1 level) the input to inverter 288 also goes to approximately −33 volts. Resistor 284 functions to limit current, and diodes 286 and 287 function to limit voltages.

The output of data receiver 213 is applied to the input of voltage translator 215 on lead 214. Translator 215 operates in reverse fashion to voltage translators 191*a* to 191*n* in that it changes the voltage levels being used from being based on a −48 volt supply to being based on a +5 volt supply. Voltage translator 215 operates as follows. When the output of inverter 288 goes to −33 volts, transistor 291 turns on and draws current through resistors 294 and 293. This results in turning on transistor 295 which provides a +5 volts to the input of inverter 298. Thus the −33 volts is converted to +5 volts which is in turn converted to zero volts at the output of inverter 298. When the output of inverter 288 goes to −48 volts, transistor 291 is biased off, no current flows through resistors 294 and 293 so transistor 295 is also biased off. The input to inverter 298 is consequently zero volts, and its output is +5 volts. The output of voltage translator 215, on lead 217 is applied to the $DI_0$ input of bi-directional data bus driver 210.

Bi-directional data bus driver 210 transmits unidirectional data on its $DO_0$, $DO_1$, $DO_2$, and $DO_3$ outputs (only the $DO_0$ output being used in the present embodiment). Driver 210 receives uni-directional data on its $DI_0$, $DI_1$, $DI_2$, and $DI_3$ inputs (only the $DI_0$ input being used in the present embodiment. Driver 210 both receives and transmits data on its terminals $DB_0$, $DB_1$, $DB_2$ and $DB_3$ (only the terminal $DB_0$ being used in the present embodiment). The data on lead 125 being the data that is fed to, and received from, microprocessor 108. The $\overline{\text{Enable}}$ signal (from FIG. 6) and the $\overline{\text{Read}}$ signal (produced by inverter 300) function to control the operation of driver 210.

Figure 8:
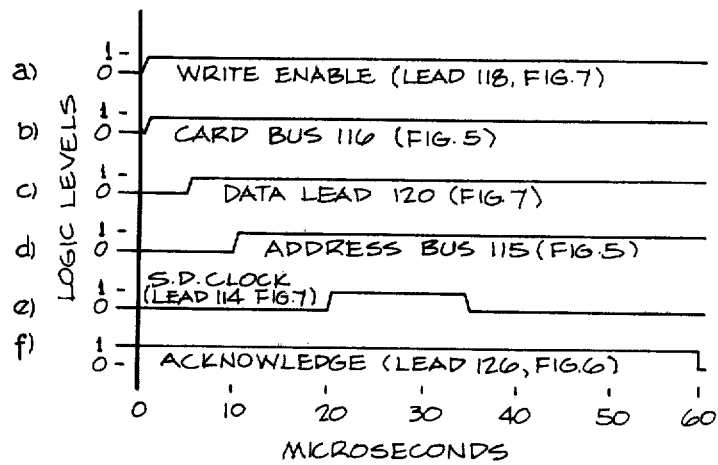
FIGS. 8 and 9 are timing diagrams to help in understanding the operation of the various Figures (especially FIGS. 5, 6 and 7).
Figure 9:
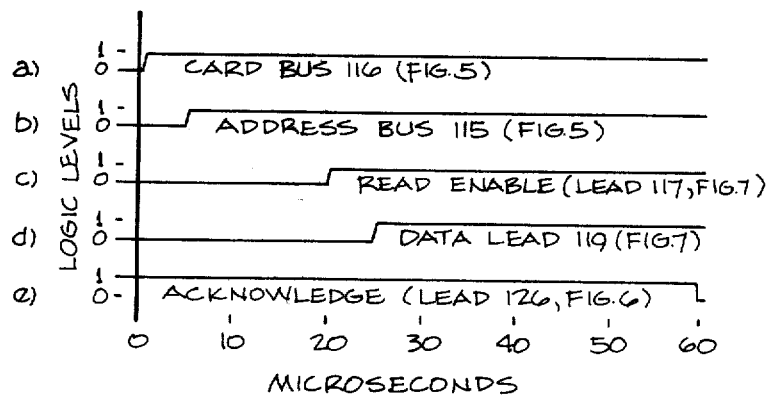

FIGS. 8 and 9 depict waveforms useful in understanding the operation of the invention. FIG. 8 depicts waveforms occurring during the write operation and FIG. 9 depicts waveforms occurring during the read operation. As it is believed that FIGS. 8 and 9 are self-explanatory, they will be described only briefly.

When a write operation is commenced (i.e. at time 0) the write enable command (on lead 118, FIG. 7) goes from a logic 0 state to a logic 1 state as depicted in FIG. 8*a*. A short time later (approximately 1.1 microseconds after the write operation is commenced) the appropriate lead of bus 116 (see FIG. 5) is enabled, which is one of the leads CRD0 to CRD7, inclusive, depending upon which card is being enabled. This is depicted in FIG. 8*b* and is referred to generally as the CRD signal, which goes from a logic 0 state to a logic 1 state. The appropriate data logic level (i.e. a logic 0 or a logic 1) appears on lead 120 (FIG. 7) approximately 5 microseconds after the start; in FIG. 8*c* the data is shown as being a logic 1. The address appears on bus 115 (see FIG. 5) approximately 10 microseconds after start, and is shown generally in FIG. 8*d*. The signal distributor clock signal, on lead 114 (see FIG. 7) appears approximately 20 microseconds after start as a logic 1, and lasts for approximately 15 microseconds as shown in FIG. 8*e*. The acknowledge signal (XACK) is depicted in FIG. 8*f*. The acknowledge signal appears on lead 126 (see FIG. 6) and remains at a logic 1 level for 60 microseconds after the start and then changes to a logic 0 level.

FIG. 9 depicts the waveforms occurring during a read operation. FIG. 9*a* depicts the signal appearing on one of the leads on bus 116 (FIG. 5) which goes to a logic 1 state approximately 1.1 microseconds after commencing the read operation. FIG. 9*b* depicts the timing of address bus 115 which is asserted approximately 5 microseconds after start. The read enable bus 117 (FIG. 7) goes to a logic 1 state approximately 20 microseconds after start, as depicted in FIG. 9*c*. The data appears on lead 119 approximately 25 microseconds after start and is depicted as a logic 1 in FIG. 9*d*. After approximately 60 microseconds the acknowledge signal (XACK) on lead 126 goes from a logic 1 to a logic 0 level as depicted in FIG. 9*e*.

What is claimed is:
1. A static, solid-state originating register apparatus for use with an electromechanical telephone cross-bar switching system, said originating register apparatus comprising:
   a plurality of static, solid-state scan networks responsive to an equal plurality of scan points, in a one-to- one relationship, for monitoring the status of said scan points;

a plurality of static, solid-state signal distributor networks for activating associated equipment in said switching system;

a microprocessor for controlling the operation of both said scan networks and said signal distributor networks; and an isolator means for interfacing said microprocessor with both said scan networks and said signal distributor networks wherein said isolator means comprises:

means for changing the voltage levels of at least some address signals, originating from said microprocessor, to voltage levels suitable for use with both said signal distributor networks and said scan networks;

logic means, for providing command signals to read and to write, based both upon the logic states of a predetermined portion of the address signals, and upon the read and write signals generated by said microprocessor;

delay means, responsive to output signals of said logic means, for selectively delaying the occurrence of a read signal, a write signal and a signal distributor clock signal so as to provide a proper timing sequence for appropriate operations;

means, for changing the voltage levels of signals eminated from said delay means, to voltage levels suitable for use with both said scan networks and said signal distributor networks; and a data link interface means for interfacing bi-directional data transmitted to or from said microprocessor, on a bi-directional data link, both with the data received from said scan networks, on a uni-directional data link, and with the data transmitted to said signal distributor networks, on a uni-directional data link.

2. A static, solid-state originating register apparatus for use with an electromechanical telephone cross-bar switching system, said originating register apparatus comprising:

a plurality of static, solid-state scan networks responsive to an equal plurality of scan points, in a one-to-one relationship, for monitoring the status of said scan points;

a plurality of static, solid-state signal distributor networks for activating associated equipment in said switching system;

a microprocessor for controlling the operation of said scan networks and said signal distributor networks; and an isolator means for interfacing said microprocessor with both said scan networks and said signal distributor networks;

said isolator means comprising (a) means for changing the voltage levels of a predetermined portion of address signals, originating from said microprocessor, to voltage levels compatible with said signal distributor networks and said scan networks; (b) logic means for producing command signals to read and to write, in response to signals generated by said microprocessor; (c) delay means for selectively delaying the read and write commands from said logic means, prior to applying them to said scan networks and said signal distributor networks, and for producing a signal distributor clock pulse so as to provide a proper timing sequence for appropriate operations; and (d) a means for interfacing bi-directional data to or from said microprocessor with uni-directional data of both said scan networks and said signal distributor networks.

3. The static, solid-state originating register apparatus of claim 2 wherein there are both scan networks and signal distributor networks in quantities sufficient for providing the capacity of two originating registers and wherein said single microprocessor and said single isolator means are time shared between all said scan networks and all said signal distributor networks.

4. The static, solid-state originating register apparatus of claim 3 wherein there are sixty-four scan networks and one hundred and ninety-two signal distributor networks.

5. The static, solid-state originating register apparatus of claim 2, 3 or 4 wherein said logic means, for producing the command signals, is responsive both to a predetermined portion of the address signals, generated by said microprocessor, and to command signals for reading and for writing generated by said microprocessor.

6. The static, solid state originating register apparatus of claim 2, 3 or 4 wherein n said scan networks are grouped together with the output of each network in the group being applied to one of the n inputs of a one-out-of-n selector, in a one-to-one relationship, wherein according to an address received at said selector, from said microprocessor via said isolator means, one of said n scan networks is selected, wherein n is a positive integer such that $2 \leq n \leq 32$.

7. The static, solid-state originating register apparatus of claim 6 wherein n=32.

8. The static, solid-state originating register apparatus of claim 2, 3 or 4 wherein n said signal distributor networks are grouped together with the input of each said signal distributor network in the group being responsive to one of the n outputs of a one-out-of-n selector, in a one-to-one relationship, wherein according to an address received by said one-out-of-n selector, from said microprocessor via said isolator means, one of said n signal distributor networks is selected, wherein n is a positive integer such that $2 \leq n \leq 32$.

9. The static, solid-state originating register apparatus of claim 8 wherein n=32.

* * * * *